United States Patent [19]

Krtek

[11] 4,321,663
[45] Mar. 23, 1982

[54] PROCESS OF PULSE DURATION MODULATION OF A MULTI-PHASE CONVERTER

[75] Inventor: Jan Krtek, Karlovy Vary, Czechoslovakia

[73] Assignee: CKD Praha, oborovy podnik, Prague, Czechoslovakia

[21] Appl. No.: 41,343

[22] Filed: May 22, 1979

Related U.S. Application Data

[63] Continuation-in-part of Ser. No. 811,888, Jun. 30, 1977, abandoned.

[30] Foreign Application Priority Data

Jun. 30, 1976 [CS] Czechoslovakia ............... 4319-76

[51] Int. Cl.³ .......................................... H02M 7/515
[52] U.S. Cl. ..................................... 363/137; 363/41
[58] Field of Search ............. 363/28, 41, 42, 79, 363/96, 135–137

[56] References Cited

U.S. PATENT DOCUMENTS

| | | | |
|---|---|---|---|
| 3,603,867 | 9/1971 | Cuenoud | 363/42 |
| 3,624,486 | 11/1971 | Oates | 363/41 |
| 3,886,431 | 5/1975 | Meier | 363/41 |

*Primary Examiner*—William M. Shoop
*Assistant Examiner*—Peter S. Wong

[57] ABSTRACT

A process of pulse duration modulation for improved voltage and frequency efficiency of a multi-phase converter. The sum of the time dependent voltage of a load phase and of an auxiliary time dependent voltage is formed, wherein the auxiliary time dependent voltage is the same for all converter phases. The pulse duration of the output voltage of each converter phase is modulated with said voltage sum.

6 Claims, 19 Drawing Figures

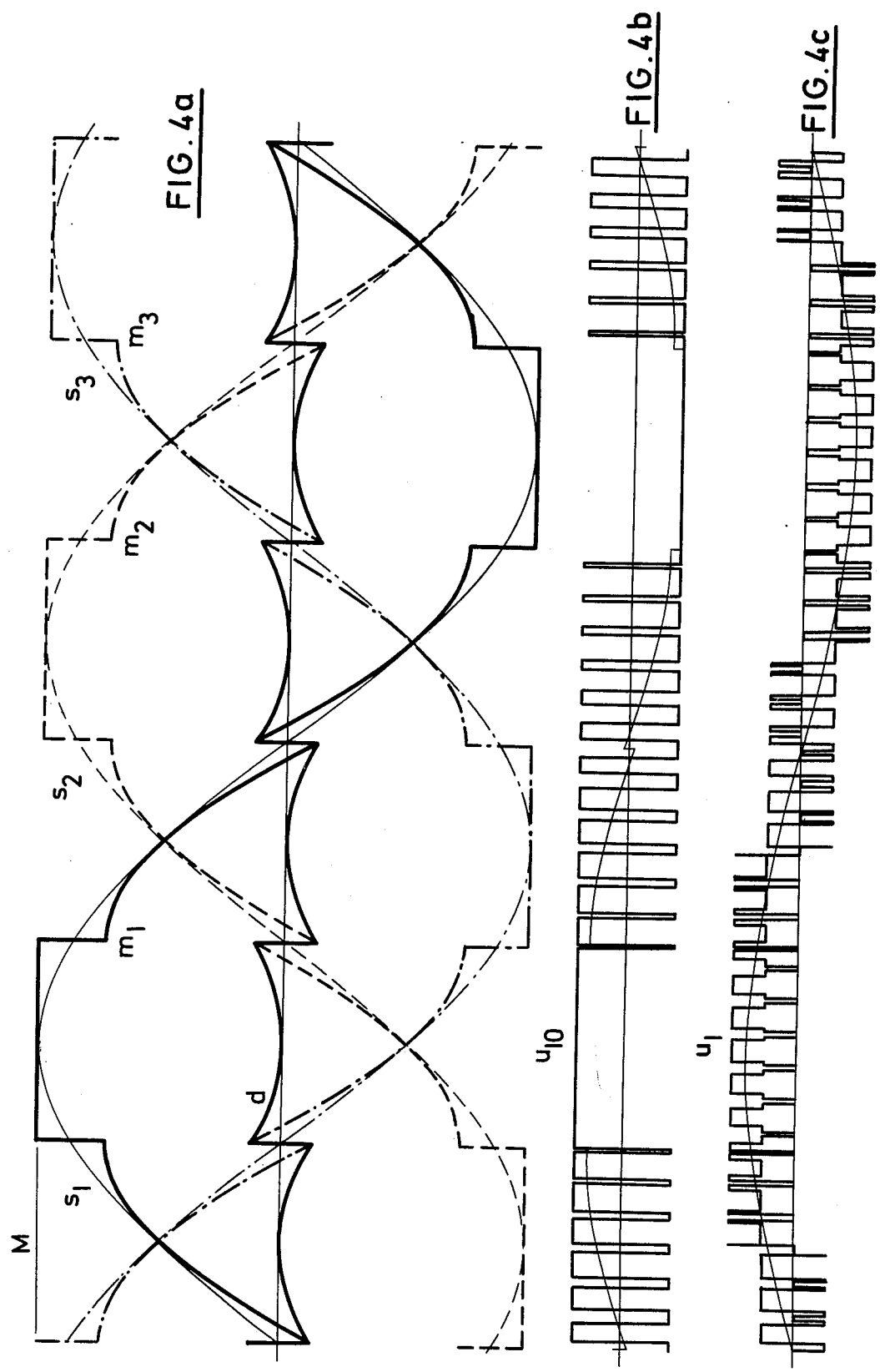

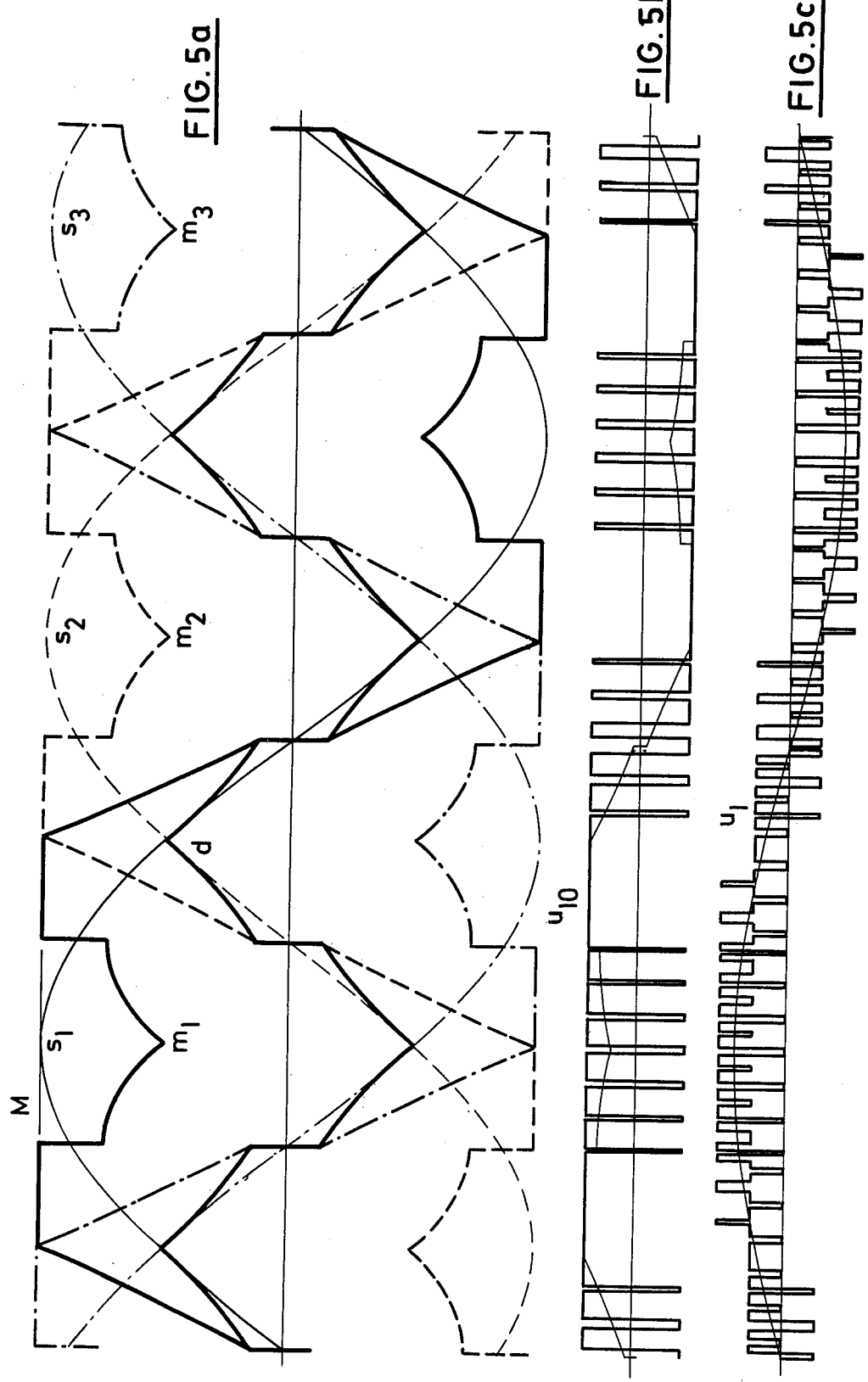

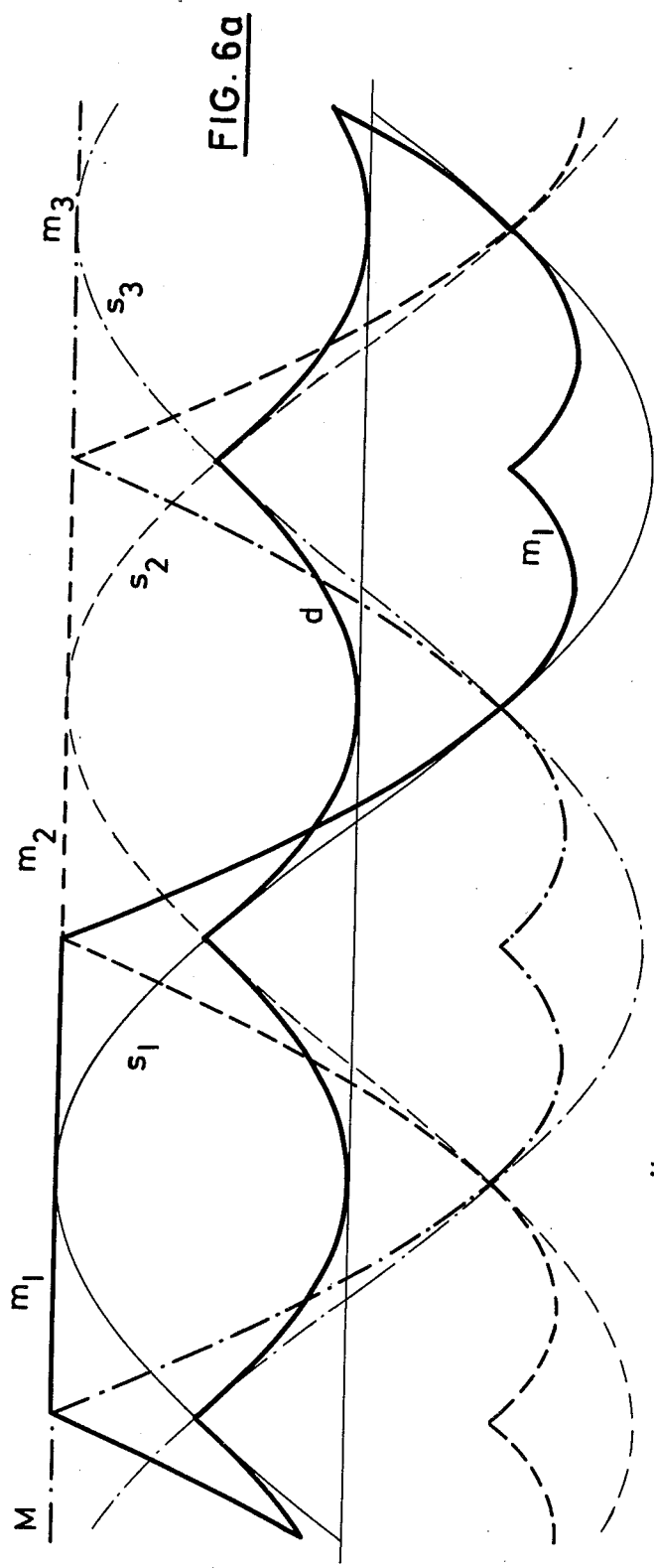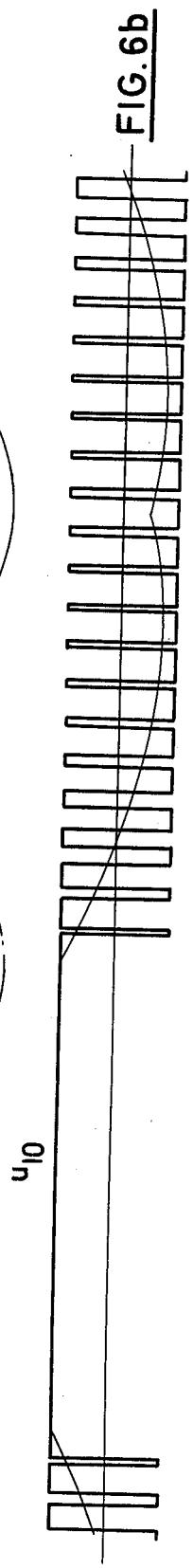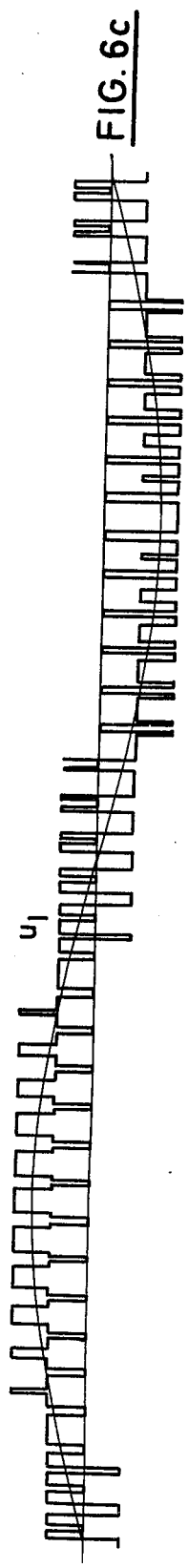

4,321,663

PROCESS OF PULSE DURATION MODULATION OF A MULTI-PHASE CONVERTER

This application is a continuation-in-part of application Ser. No. 811,888, filed June 30, 1977, now abandoned.

BACKGROUND OF THE INVENTION

1. Field of the Invention

This invention relates to a process of pulse duration modulation for improved voltage and frequency efficiency of a multi-phase pulse forming converter.

2. Description of the Prior Art

Processes for pulse duration modulation are known and are based on modulating the duration of the output voltage pulses of each converter phase with the desired time dependent voltage corresponding to the time dependent voltage of the appropriate load phase. The frequency spectrum of the output voltage of the converter comprises a modulating time dependent component, possibly higher harmonics thereof and additional waves having frequencies consisting of integral linear combinations of the modulating frequency and of the so-called carrier frequency determined by the pulse number and pulse type of the output voltage.

With increasing multiplexity of the modulating frequency and of the carrier frequency in general the importance of the waves decreases as a result of smaller amplitudes and larger frequencies. There are two disadvantages connected with this method. The modulated amplitude of the desired time dependent voltage is limited to a value corresponding to the merging of two neighboring pulses in the output voltage of the converter. Depending on the circuitry of the converter, on the number of the independently controllable switching elements in one phase and on a definite concrete type of pulse duration modulation, there is a limit to the applicable minimal value of the ratior carrier frequency and modulating frequency. In addition there is a limit to the frequencies for which the converter is useful. Sometimes it is unavoidable to select a disadvantageously high frequency of the switching processes in the converter for a certain frequency of the converter output voltage.

SUMMARY OF THE INVENTION

1. Purposes of the Invention

It is an object of the invention to provide a process of pulse modulation which improves the voltage and frequency efficiency of a multi-phase converter.

It is another object of the invention to provide a process for efficient modulation of the output voltage pulses of each converter output phase of a multi-phase converter with the sum of the desired time dependent voltage of the corresponding load phase and of a time dependent auxiliary voltage, wherein the auxiliary voltage is the same for all output phases of the converter.

2. Brief Description of the Invention

The present invention discloses a process of pulse duration modulation for obtaining improved voltage and frequency efficiency of a multi-phase converter. The sum is formed of the desired time dependent voltage of the corresponding load phase and of an auxiliary time dependent voltage, wherein the auxiliary time dependent voltage is the same for all converter output phases. The pulse duration of the output voltage of each converter phase is then modulated with the said sum.

The auxiliary time dependent voltage can be set as the negative one half of the sum of the maximum value at each moment of the voltages of the load phases and of the minimum value at each moment of the voltages of the load phases.

Alternatively, the auxiliary time dependent voltage can be set as the difference of the maximum attainable modulating voltage and of the maximum of the absolute value of the voltages of the load phases, said differences having the same sign as the load voltages having the largest absolute value.

Furthermore, the auxiliary time dependent voltage can be set as the difference of the maximum attainable modulating voltage and the intermediate absolute value of the voltages of the load phases, said differences having the sign of the intermediate voltage of the load phase having the intermediate absolute value of the load phase.

Furthermore, the auxiliary time dependent voltage can be set as the difference of the maximum attainable modulating voltage and of the maximum of the voltages of the load phase or as the negative sum of the maximum attainable modulating voltage and of the minimum of the voltages of the several load phases.

An appropriate choice of an auxiliary time dependent voltage allows to modulate the desired, in particular sinusoidal, time dependent voltage onto the load. This can be done with a larger amplitude than that provided with conventional processes of pulse duration modulation. E.g. the sinusoidal voltage amplitude of the load can be increased up to $1/\sin 60°$, i.e. 15.5% for a three phase converter.

A further advantageous effect can be achieved with such choice of the auxiliary time dependent voltage, where the sum of the desired and of the auxiliary time dependent voltage is equal over a certain part of the period either to the positive or negative of the maximum attainable modulating voltage. For this part of the period the frequency of the switching processes in the converter decreases while the unchanged value of the carrier frequency remains as a characteristic value determining in combination with the modulating frequency the possible wave frequencies of the frequency spectrum of the converter output voltage. E.g. the frequency of the switching processes in the converter can be reduced by a third with the same carrier frequency.

The invention accordingly consists in the series of steps which will be examplified in the process hereinafter described and of which the scope of application will be indicated in the appended claims.

BRIEF DESCRIPTION OF THE DRAWING

In the accompanying drawing in which are shown several of the various possible embodiments of the invention.

FIG. 4a is a diagram of the time dependent voltages for an auxiliary time dependent voltage set according to the $d=\text{sign }(\text{mas}/S_1, S_2, S_3/)(M-\text{max}/S_1, S_2, S_3/)$;

FIG. 4b shows the curve of the time dependent voltage $u_{10}$ of the output voltage of one load phase;

FIG. 4c shows the time dependent voltage $u_1$ of the corresponding load phase;

FIG. 5a shows the desired dependent voltages at the load $s_1, s_2, s_3$; the auxiliary time dependent voltage de and the modulated time dependent voltages $m_1=s_1+d$, $m_2=s_2+d$, $m_3=s_3+d$ and the maximum modulated voltage M;

FIG. 5b shows the curve of the time dependent output voltage $u_{10}$ of one load phase;

FIG. 5c shows the time dependent voltage $u_1$ along the corresponding load;

FIG. 6a shows the desired time dependent voltages $s_1, s_2, s_3$ of the load, the auxiliary time dependent voltage d; and the modulating time dependent voltages $m_1=s_1+d, m_2s_2+d, m_3=s_3+d$ and the maximum modulating voltage M;

FIG. 6b shows the curve of the time dependent output voltage $u_{10}$ of one load phase; and FIG. 6c shows the time dependent voltage $u_1$ measured along the corresponding load phase;

In each of FIGS. 2a, 3a, 4a, 5a, and 6a the voltage $s_1$ of a first phase is shown as a solid line, the voltage small $s_2$ of a second phase is shown as a dash line, and the voltage $s_3$ of a third phase is shown as a dot-dash line.

DETAILED DESCRIPTION OF THE PREFERRED EMBODIMENTS

The term pulse duration modulated includes the concepts of pulse duration modulated, pulse width modulated and pulse length modulated as they are used in the field.

Figure 1:
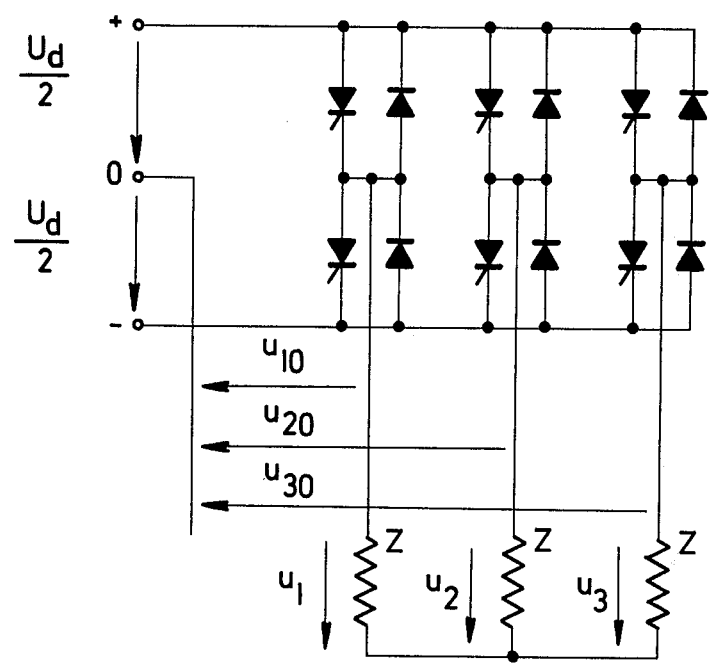
FIG. 1 is a schematic diagram of the power circuit of a simple three phase converter with a star circuit load.

Referring now to FIG. 1 an input voltage $u_d$ is fed to the converter circuit shown.

The three time dependent output voltages are labeled $u_{10}, u_{20}, u_{30}$. The load impedance is designated as Z in FIG. 1 for each load of a star group for the three phase output of the converter. The voltages measured along the loads are shown as $u_1, u_2, u_3$. The circuit diagram of FIG. 1 shows the power circuit of a simple three phase converter where the circuits for forced commutation are omitted for clarity. The voltages $u_{10}, u_{20}, u_{30}$ are output voltages of the several phases of the converter measured against the medium of the input voltage $u_d$ FIG. 2a does not show any auxiliary time dependent voltage present and therefore the desired sinusoidal time dependent voltages along the load $s_1, s_2, s_3$ are in this case identical with the modulating time dependent voltages $m_1, m_2, m_3$ for effecting the pulse duration modulation, and resulting in the varying widths of the pulses of the output voltages $u_{10}, u_{20}, u_{30}$. This modulation can be performed directly with identical carrier frequency for all phases according to a comparison of the modulating time dependent voltage with the triangle voltage.

Figures 2A, 2B, 2C:
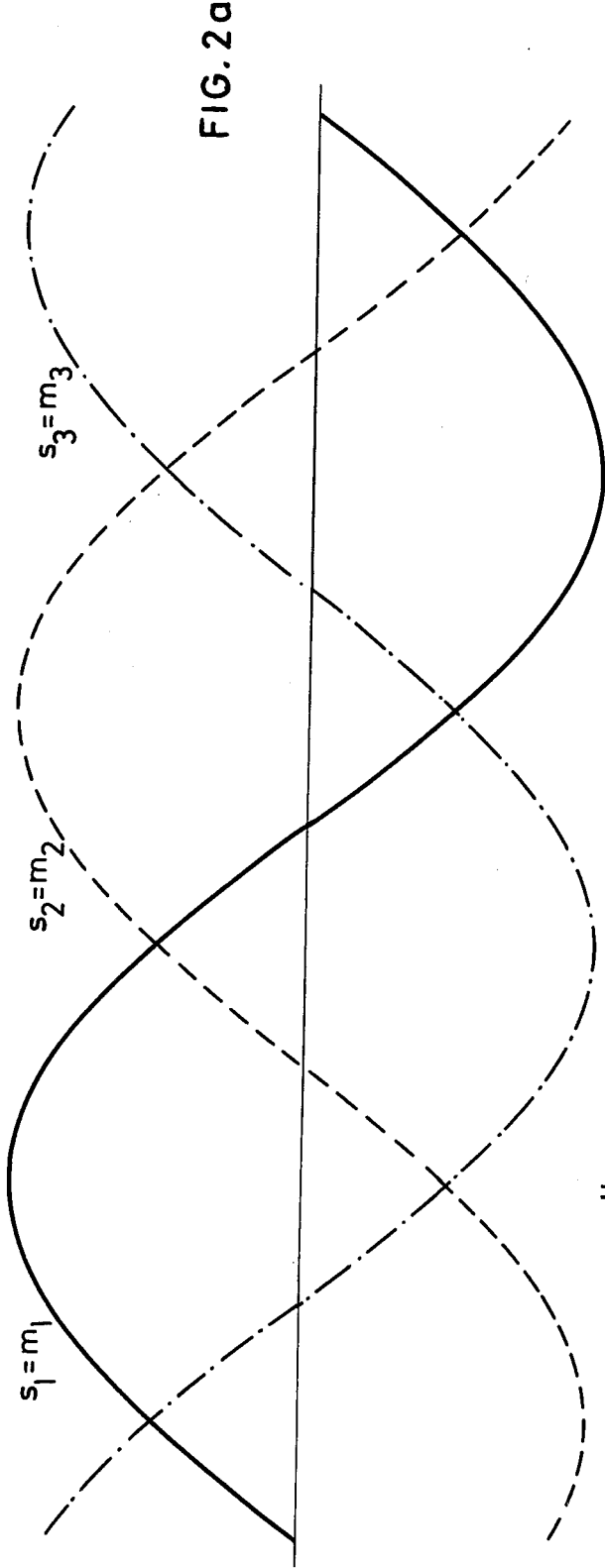
FIG. 2a is a diagram of the time dependent voltages for zero auxiliary time dependent voltage.
FIG. 2b is a graph of the output voltage of a first converter phase plotted against time.
FIG. 2c is a graph showing the voltage of the corresponding first load phase against time.

FIG. 2b shows the curve of the output voltage $u_{10}$ of a converter phase and FIG. 2c shows the curve of a voltage $u_1$ of the corresponding load phase and wherein waves are excluded which do not form part of a three phase system.

Figure 3A:
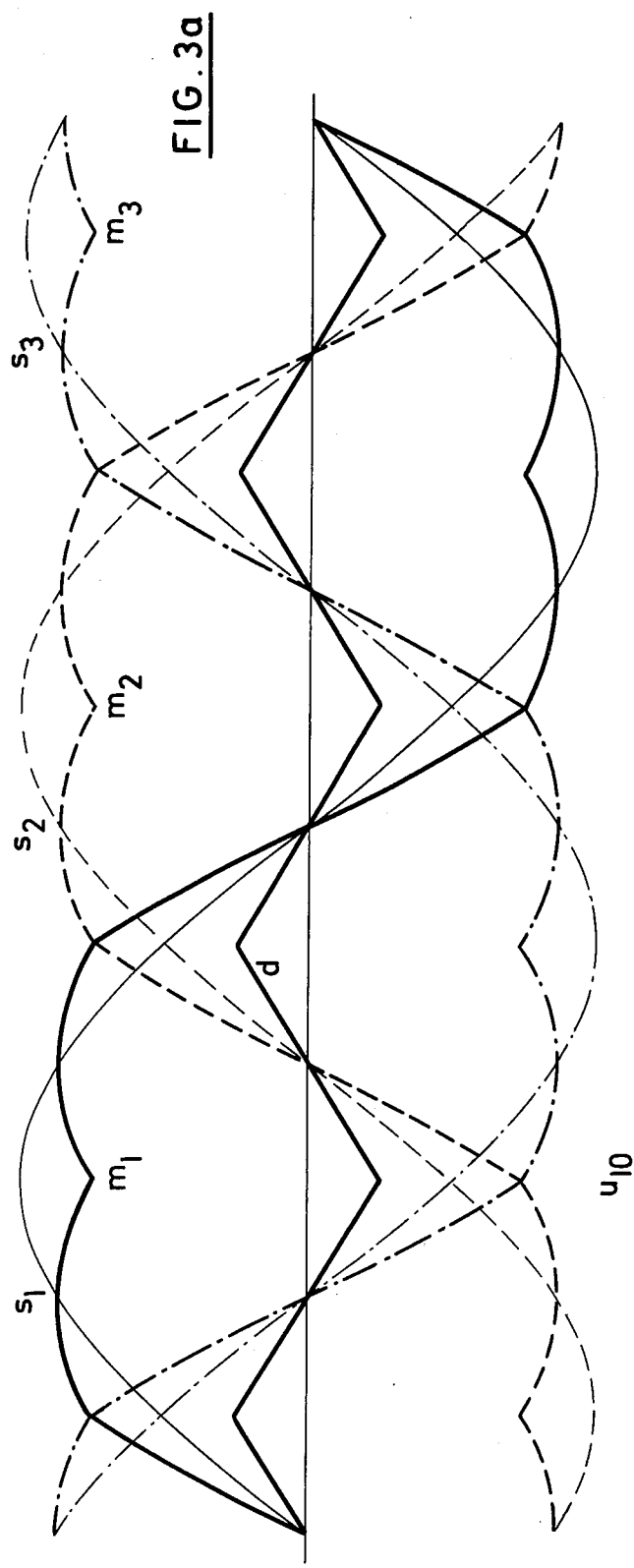
FIG. 3a is a diagram of the time dependent voltages for an auxiliary time dependent voltage set according to the formula $d = -\frac{1}{2} \max(S_1, S_2, S_3) - \frac{1}{2}(S_1, S_2, S_3)$.
Figure 3B:
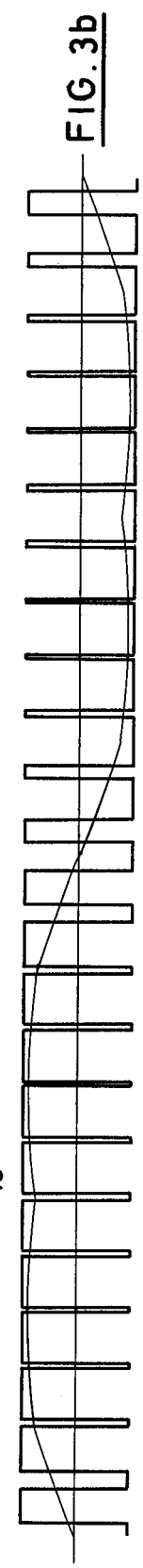
FIG. 3b shows the curve of the output voltage $u_{10}$ of a converter phase which contains the full modulating voltage curve $m_1=s_1+d$.
Figure 3C:
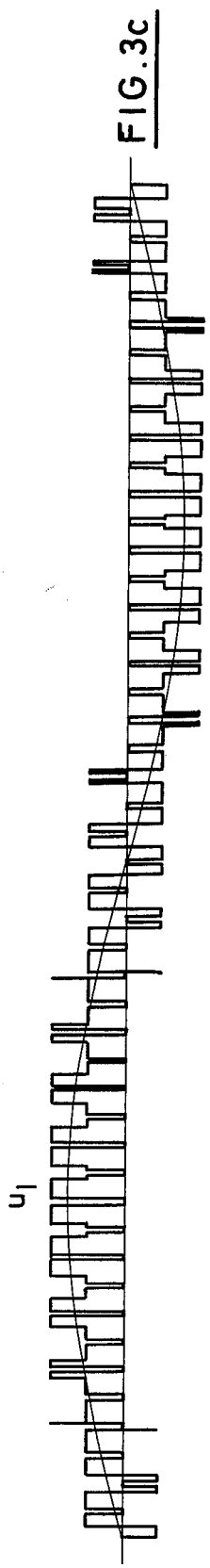
FIG. 3c shows the curve of the voltage $u_1$ of the corresponding load phase.

FIGS. 3a, 3b, and 3c show an example wherein the auxiliary time dependent voltage is set by the formula having the momentary value of the voltage d equal to the negative half of the sum of the momentary value of the desired sinusoidal time dependent voltages along the load $s_1, s_2, s_3$, which has the largest value at that moment and of the voltage which has the smallest (negative) value at the same moment. If we denote with $s_1, s_2, s_3$ the group of elements $s_1, s_2, s_3$ then max $s_1, s_2, s_3$ denotes the maximum value among the elements $s_1, s_2, s_3$ for each moment of time, and min $s_1, s_2, s_3$ denotes the minimum value among the elements $s_1, s_2, s_3$ for each moment of time. Then the auxiliary time dependent voltage d can be expressed as follows:

$$d = -\tfrac{1}{2}\max(S_1, S_2, S_3) - \tfrac{1}{2}\min(S_1, S_2, S_3)$$

In FIG. 3a there are shown the desired sinusoidal time dependent voltages of the several load phases $s_1, s_2, s_3$; the auxiliary time dependent auxiliary voltage d and the modulating time dependent voltages $m_1=s_1+d$, $m_2=s_2+d$, $m_3=s_3+d$ inducing the pulse duration modulation of the several output phases of the converter.

FIG. 3b shows the curve of the output voltage $u_{10}$ of a converter phase, which contains the full modulating voltage curve $m_1=s_1+d$ and in FIG. 3c is shown the curve of the voltage $u_1$ of the corresponding load phase.

FIGS. 4a, 4b, and 4c represent the situation where the auxiliary time dependent voltage d is set at each moment of time by the difference between the maximum modulating value which can be attained and which is designated as M and the momentary value of one of the desired time dependent voltages $s_1, s_2, s_3$ having at that moment of time the largest absolute value and giving the resulting value the same sign as that of the particular time dependent voltage $s_i$ which enters into the formation of the difference. It the absolute value of $s_i$ is designated as as $S_1/$, then the auxiliary time dependent voltage d of FIG. 4 can be expressed by the formula:

$$d = (M - \max/S_1, S_2, S_3/)\text{ sign }(\max/S_1, S_2, S_3/).$$

Sign $(\max/S_1, S_2, S_3/)$ refers to the sign of that desired time dependent voltage $s_i$, the absolute value of which is the largest at that moment of time.

FIG. 4b shows the curve of the time dependent voltage $u_{10}$ of the output voltage of one load phase and FIG. 4a shows the time dependent voltage $u_1$ of the corresponding load phase. FIGS. 5a, 5b, and 5c show the situation, where the auxiliary time dependent voltage d is formed by the difference between the maximum attainable modulating voltage M and that of the desired dependent voltages $s_i$ of the load phases having at the moment of time the second largest absolute value and giving the difference the same sign as the voltage having the second largest absolute value.

If the absolute value of the voltage having the second largest or intermediate absolute value is designated as intm/$S_1$, $S_2$, $S_3$/ then the auxiliary time dependent voltage can be expressed by the formula:

$$d = (M - \text{intm}/S_1, S_2, S_3/) \cdot \text{sign} (\text{intm}/S_1, S_2, S_3/).$$

FIG. 5a shows the desired time dependent voltages at the load $s_1$, $s_2$, $s_3$; the auxiliary time dependent voltage d and the modulated time dependent voltages $m_1 = s_1 + d$, $m_2 = s_2 + d$, $m_3 = s_3 + d$ and the maximum modulated voltage M.

FIG. 5b shows the curve of the time dependent output voltage $u_{10}$ of one load phase and FIG. 5c shows the time dependent voltage $u_1$ along the corresponding load.

FIGS. 6a, 6b, and 6c show the situation where the auxiliary time dependent voltage d is formed by the difference between the maximum attainable modulating voltage M and that of the desired time dependent voltages $s_1$, $s_2$, $s_3$ having a maximum at that moment. This can be represented by the formula $d = m - max (S_1, S_2, S_3)$.

FIG. 6a shows the desired time dependent voltages $s_1$, $s_2$, $s_3$ of the load, the auxiliary time dependent voltage d; and the modulating time dependent voltages $m_1 = s_1 + d$, $m_2 = s_2 + d$, $m_3 = s_3 + d$ and the maximum attainable modulating voltage M.

FIG. 6b shows the curve of the time dependent output voltage $u_{10}$ of one load phase and in FIG. 6c the time dependent voltage $u_1$ measured along the corresponding load phase.

A result related to that of FIGS. 6a, 6b, and 6c is obtained when such figures are turned upside down. In this case the auxiliary time dependent voltage would be set as the negative sum of the maximum modulating voltage and of the minimum of the voltages of the several load phases, which can be expressed with the formula: $d = -M - \min (S_1, S_2, S_3)$.

Figure 7A:
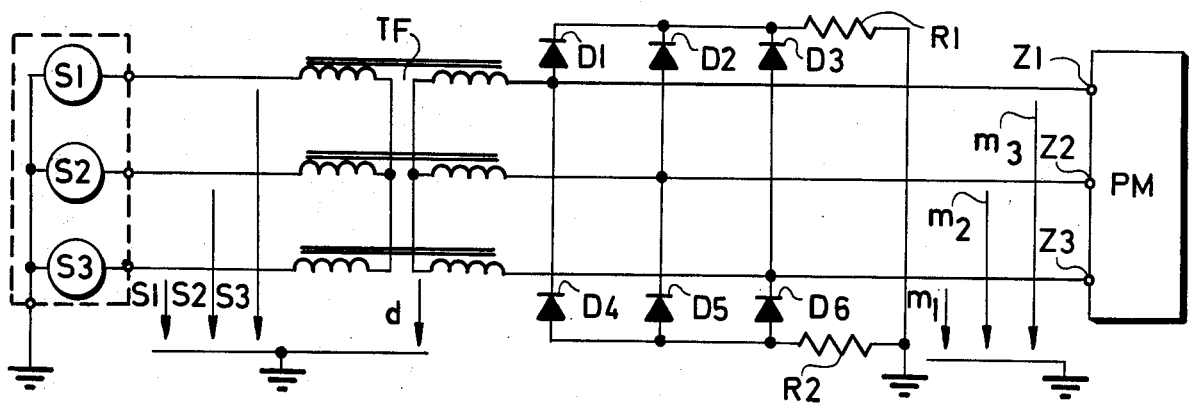
FIG. 7a is an example of a circuit to be used for generating modulating time dependent voltages $m_1, m_2, m_3$ shown in FIGS. 3a-3c.

In FIG. 7a relating to the wave forms in FIGS. 3a–3c, a source of the desired sinusoidal time dependent voltages $s_1$, $s_2$ and $s_3$ (FIG. 3) corresponding to the desired wave forms of voltages $u_1$, $u_2$, $u_3$ on the inverter load phases (FIG. 1), is shown, quite in general, as three voltage sources $S_1$, $S_2$, $S_3$ the voltages of which are related to common earth potential. The block PM designates a pulse width modulator, viz. inverter of input analog signals (here voltages) applied to inputs terminals $Z_1$, $Z_2$, $Z_3$ for inverting said signals into pulse width signals to be further availed of for selecting the on- and off-switch instants of thyristors of the inverter shown in FIG. 1. In accordance with prior art (see FIG. 2), the voltage sources $S_1$, $S_2$, $S_3$ would be immediately connected to the input terminals $Z_1$, $Z_2$, $Z_3$ of the modulator PM. Diodes D1 through D6 together with resistors R1 and R2 of the same resistance and with the three phase adding transformer TF are designed for generating a time dependent auxiliary voltage d (see FIG. 3a) and for adding the latter to the desired time dependent waveforms $s_1$, $s_2$, $s_3$. The thus obtained summary voltages $m_1$, $m_2$, $m_3$ are applied to the input terminals $Z_1$, $Z_2$, $Z_3$ of the modulator PM. To process also relatively low voltages $S_1$, $S_2$, $S_3$ it is possible to improve the circuit according to FIG. 7a by connecting an auxiliary resistor in parallel to each of the diodes D1 through D6.

Figure 7B:
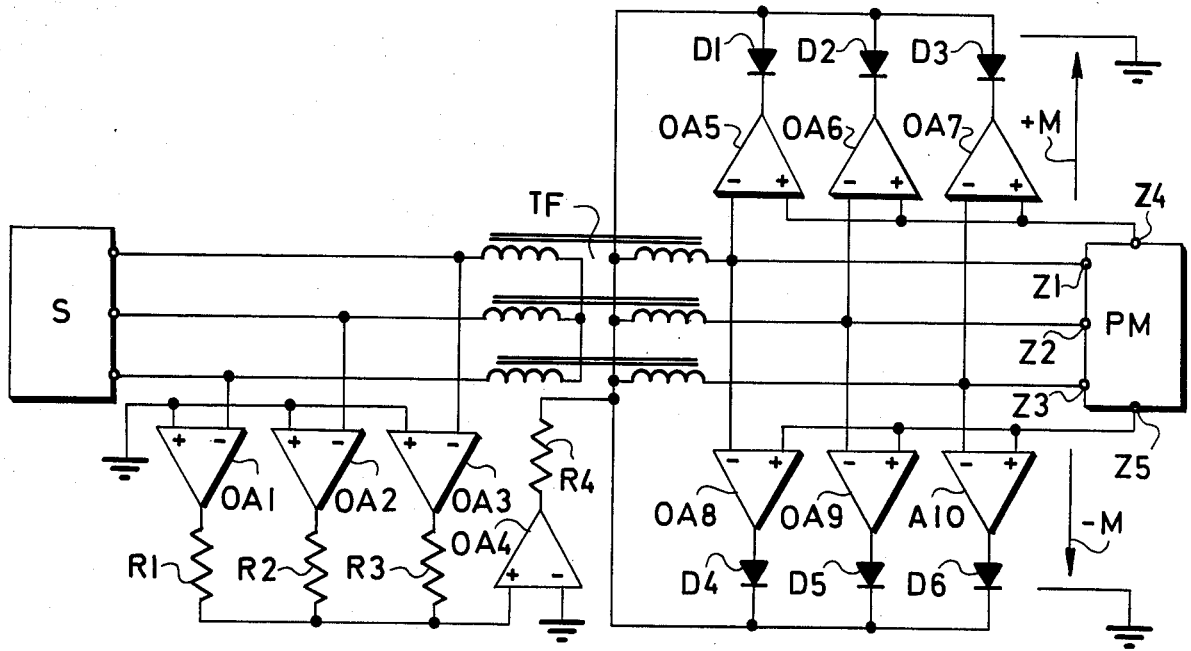
FIG. 7b is an example of a circuit to be used for generating modulating time dependent voltages $m_1, m_2, m_3$ shown in FIGS. 4a-4c, or FIGS. 5a-5c.

FIG. 7b shows an example of circuit wherein to the desired sinusoidal waveforms $s_1$, $s_2$, $s_3$ the auxiliary time dependent voltage d in accordance with FIG. 4a is added, or that of FIG. 5a if the inverting and the non-inverting inputs of operation amplifier OA4 are exchanged. In this figure, the block S stands for three voltage sources $S_1$, $S_2$, $S_3$ as shown in FIG. 7a while the block PM denotes again the modulator.

The voltage at the auxiliary output $Z_4$ of the modulator PM represents the positive value plus M of the maximum modulating voltage M (see FIGS. 4 to 6, incl.). This is a limit value of the voltage to which, if applied to any of the input terminals $Z_1$, $Z_2$, $Z_3$ of the modulator PM, just corresponds the zero width of low level pulses at the corresponding modulator output. In case of a conventional modulator operating upon the Natural Sampling or Uniform Sampling principles, said limit value corresponds to a positive amplitude of auxiliary sawtooth voltage which is compared in the modulator with the input analog voltage. At the auxiliary output terminal $Z_5$ of the modulator PM, the negative value minus M of the maximum modulating voltage M is accessible. To the voltage minus M applied to the modulator input there would just correspond zero width of high level pulses at the modulator outlet. The part of the circuitry consisting of operation amplifiers OA1, OA2, OA3 and OA4 interconnected as comparators, and of resistors R1, R2, R3, and R4 determines the instantaneous polarity of the auxiliary time dependent voltage d whereas the part of the circuit comprising operation amplifiers OA5 through OA10, diodes D1 through D6 and the adding transformer TF determines the instantaneous magnitude of the auxiliary time dependent voltage d shown in FIG. 4a. In the event the inverting and the non-inverting inputs of the operating amplifier OA4 are interchanged, the auxiliary time dependent voltage d and, $m_1$, $m_2$, $m_3$ will correspond to those shown in FIG. 5a.

Figure 7C:
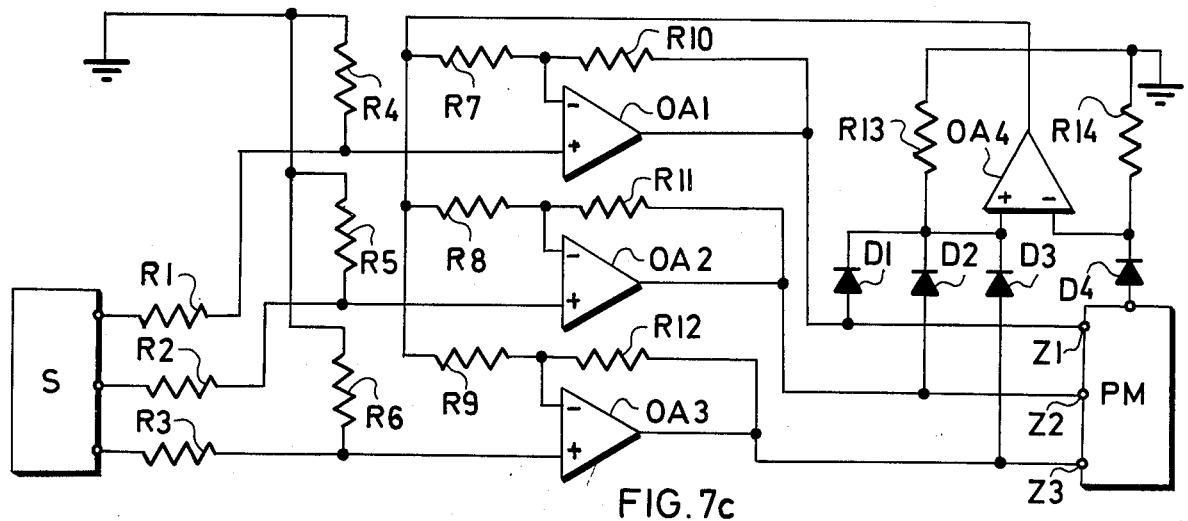
FIG. 7c is an example of a circuit to be used for generating modulating time dependent voltages $m_1, m_2, m_3$ shown in FIGS. 6a-6c.

FIG. 7c represents an example of circuit designed to obtain the pulse width modulation variant shown in FIG. 6. The significance of the blocks S and PM as well as of terminals Z1 through Z4 is the same as in FIG. 7b. In lieu of the adding transformer TF (see FIGS. 7a and 7b) this circuit modification makes use of adders constituted by the operating amplifiers OA1 through OA3 and the resistors R1 through R12. The circuit comprising the operation amplifier OA4, the diodes D1 through D4 and the resistors R13 and R14 generates the inverted auxiliary time dependent voltage d shown in FIG. 6a.

To demonstrate the variability of practical circuit implementations of the claimed method of pulse width modulation, various circuitry principles have been availed of for fulfilling the same partial functions as shown in FIGS. 7a, 7b, and 7c. Thus, for instance, for adding the voltages $S_1$, $S_2$, $S_3$ to the auxiliary d there are designed mutually interchangeable adding transformer TF (FIGS. 7a and 7b) and an adder based upon operation amplifiers; one possible connection of the adder is demonstrated by the circuit in FIG. 7c. A sectional circuit (FIG. 7c) comprising the operation amplifier OA4, the diodes D1 through D4 and the resistors R13 and R14 is replaceable by a sectional circuit (FIG. 7b) consisting of operation amplifiers OA5 through OA7 and the diodes D1 through D3, provided that the node of resistors R7 through R9 (FIG. 7c) is connected, via a resistor, to a sufficiently high positive potential. On the contrary, the above-mentioned sectional circuit shown in FIG. 7c could replace, admittedly with a lower exactness, the above sectional circuit shown in FIG. 7b, provided that the output of the operation amplifier OA4 is connected via a diode. In a similar way, also the operation amplifiers OA8 through OA10 (FIG. 7b) can be replaced. As well a diode rectifier (FIG. 7a) consisting of the diodes D1 through D6 can be replaced by a well-known connection of an ideal dropless rectifier based upon operation amplifiers and diodes.

As examples of the practical realization of the method there have been chosen circuits in which physical carriers of the time dependent waveforms as shown in FIGS. 3-6, incl., are constituted by instantaneous voltage magnitudes. Such circuits are instructive and yet usual in technical practice. However, it is to be noted that it is quite irrevelevant for the claimed method of pulse width modulation and for the resulting effect thereof, viz. raising both voltage and frequency versality of the inverter as well as improving frequency spectrum of its output spectrum of its outlet voltage, whether the physical carriers of time behaviors in the control circuits are constituted by instantaneous magnitudes of voltage or current, number expressed in binary or any other code, frequency, or the like.

It thus will be seen that there is provided a process which achieves the various objects of the invention and which is well adapted to meet the conditions of practical use.

As various possible embodiments might be made of the above invention, and as various changes might be made in the embodiments set forth, it is to be understood that all matter herein described or shown in the accompanying drawing is to be interpreted as illustrative and not in a limiting sense.

What is claimed is:

1. A process of pulse duration modulation for improved voltage and frequency efficiency of a multi-phase converter, comprising the step of modulating the pulse duration of the output voltage of each converter phase with the sum of the desired time dependent voltage of the corresponding load phase and of an auxiliary time dependent voltage, wherein the auxiliary time dependent voltage is identical for all converter phases.

2. A process of pulse duration modulation for improved voltage and frequency efficiency of a multi-phase converter as set forth in claim 1, wherein the auxiliary time dependent voltage is set as the negative one half of the sum of the maximum value for each moment of time of the voltages of the load phase and of the minimum value at each moment of time of the desired voltages of the load phase.

3. A process of pulse duration modulation for improved voltage and frequency efficiency of a multi-phase converter as set forth in claim 1, wherein the auxiliary time dependent voltage is set as the difference of the maximum attainable modulating voltage and the maximum of the absolute value of the desired voltage the load phase having the sign of the load voltage which has the largest absolute value.

4. A process of pulse modulation for improved voltage and frequency of a multi-phase converter as set forth in claim 1, wherein the auxiliary time dependent voltage is set as the difference of the maximum attainable modulating voltage and the intermediate absolute value of the voltages of the load phases having the same sign as an intermediate voltage of the load phase having the intermediate absolute value of the voltages of the load phase.

5. A process of pulse modulation for improved voltage and frequency efficiency of a multi-phase converter as set forth in claim 1, wherein the auxiliary time dependent voltage is set as the difference of the maximum attainable modulating voltage and of the maximum of the desired voltages of the load phases.

6. A process of pulse modulation for improved voltage and frequency efficiency of a multi-phase converter as set forth in claim 1, wherein the auxiliary time dependent voltage is set as the negative sum of the maximum attainable modulating voltage and of the minimum of the voltages of the several load phases.

* * * * *